United States Patent
Zachrai

(12)
(10) Patent No.: US 6,489,567 B2
(45) Date of Patent: Dec. 3, 2002

(54) DEVICE FOR CONNECTING BUS BARS OF A BUS BAR SYSTEM WITH THE CONNECTORS OF A PIECE OF ELECTRIC INSTALLATION EQUIPMENT

(75) Inventor: Jürgen Zachrai, Dillenburg (DE)

(73) Assignee: Rittal Rudolf Loh GmbH & Co. KG, Dillenburg (DE)

( * ) Notice: Subject to any disclaimer, the term of this patent is extended or adjusted under 35 U.S.C. 154(b) by 0 days.

(21) Appl. No.: 09/760,871

(22) Filed: Jan. 16, 2001

(65) Prior Publication Data

US 2001/0050178 A1 Dec. 13, 2001

(30) Foreign Application Priority Data

Jan. 14, 2000 (DE) .......................................... 100 01 184

(51) Int. Cl.7 ................................................. H02G 5/00
(52) U.S. Cl. ................... 174/149 B; 361/611; 361/650; 439/212; 174/70 B
(58) Field of Search ............................... 174/68.2, 70 B, 174/71 B, 72 B, 99 B, 149 B; 439/212; 403/394, 396; 361/611, 650

(56) References Cited

U.S. PATENT DOCUMENTS

| | | | | |
|---|---|---|---|---|
| 2,733,289 A | * | 1/1956 | Warren et al. | .......... 174/138 R |
| 2,946,034 A | * | 7/1960 | Washburn | ................ 174/99 B |
| 3,044,036 A | * | 7/1962 | Hermann | ................ 174/99 B |
| 3,210,716 A | * | 10/1965 | Meacham | .................... 174/171 |
| 3,315,132 A | * | 4/1967 | Lucas | ........................ 174/72 B |
| 4,118,639 A | * | 10/1978 | Rosey et al. | ............... 174/99 B |
| 4,281,306 A | * | 7/1981 | Schoendube | ............... 174/68.2 |
| 5,213,518 A | * | 5/1993 | Weidler | ........................ 439/211 |
| 5,515,236 A | * | 5/1996 | Nolan et al. | ................ 174/68.2 |
| 5,554,040 A | * | 9/1996 | Sugiura et al. | ............. 439/212 |
| 5,854,445 A | * | 12/1998 | Graham et al. | ......... 174/133 B |
| 6,061,230 A | * | 5/2000 | Mazzella et al. | ......... 174/70 B |
| 6,180,885 B1 | * | 1/2001 | Goldman et al. | .......... 174/68.2 |
| 6,339,192 B1 | * | 1/2002 | Hashimoto | .............. 174/149 B |
| 6,381,122 B2 | * | 4/2002 | Wagener | .................... 174/71 B |

* cited by examiner

*Primary Examiner*—Dean A. Reichard
*Assistant Examiner*—Adolfo Nino
(74) *Attorney, Agent, or Firm*—Pauley Peterson Kinne & Erickson

(57) ABSTRACT

A device for connecting bus bars of a bus bar system with connectors of a piece of electric installation equipment using connecting pieces, which are cut, angled and/or bent from a rectangular flat material. The cost for different bar elements for the connection can be reduced without a need to surrender adaptation to the transmission of current strenghts of different sizes because the connecting pieces are respectively formed by several identical bar elements which are held, vertically with respect to their width, at a distance from each other which corresponds to a thickness of the flat material. The bar elements are maintained apart by a packaging holder which has alternating spacers and holding plates perpendicular with respect to a broad side of the bar elements. The holding plates delimit receivers for the bar elements on both sides of the packaging holders.

16 Claims, 1 Drawing Sheet

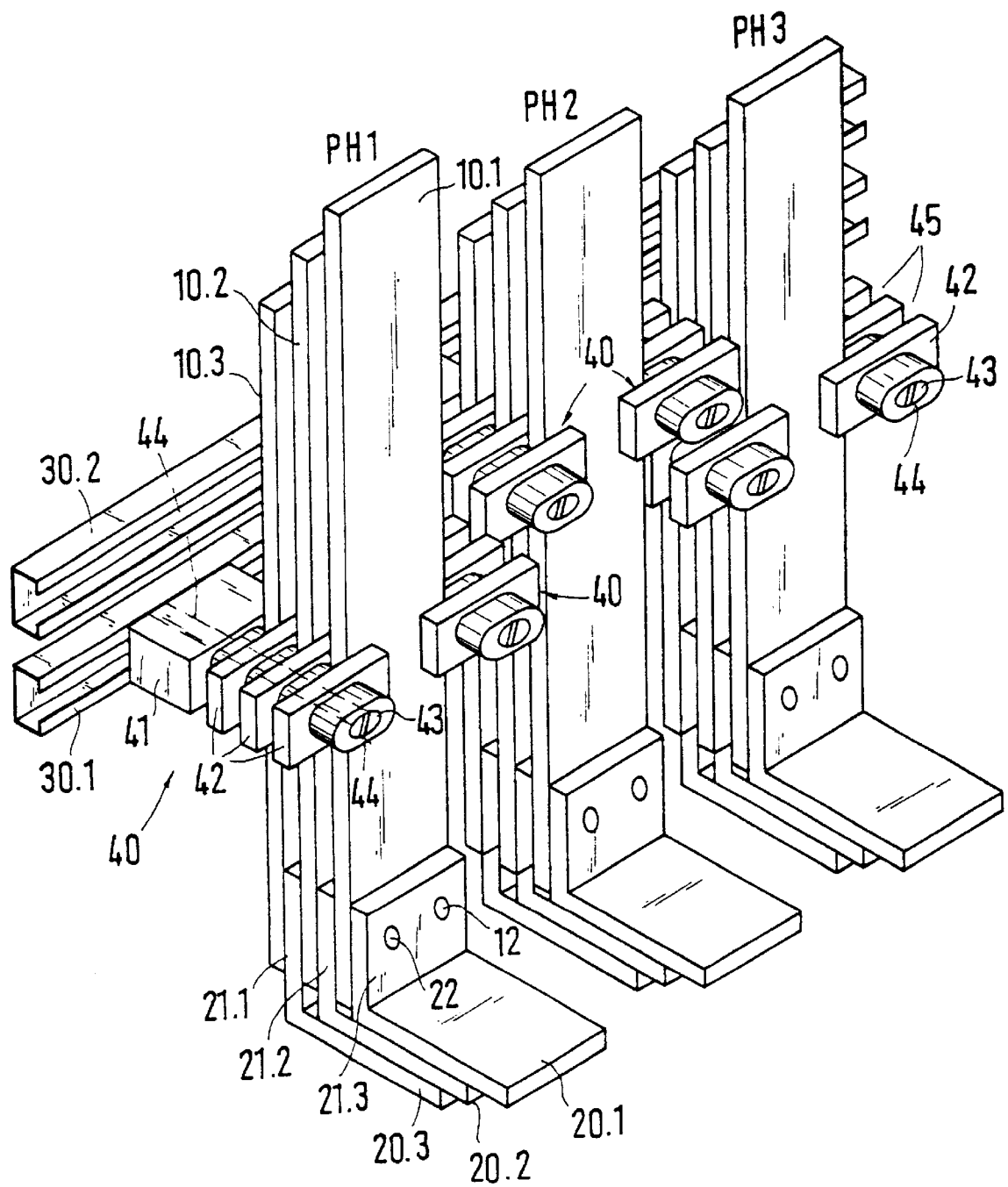

DEVICE FOR CONNECTING BUS BARS OF A BUS BAR SYSTEM WITH THE CONNECTORS OF A PIECE OF ELECTRIC INSTALLATION EQUIPMENT

BACKGROUND OF THE INVENTION

1. Field of the Invention

This invention relates to a device for connecting bus bars of a bus bar system with connectors of a piece of electric installation equipment using connecting pieces which are cut, angled and/or bent from a rectangular flat material.

2. Description of Related Art

In connection with known devices of this type, the connecting pieces are produced from flat materials which have cross sections of different sizes, depending on the current strength to be transmitted. This requires the availability of a plurality of different bar elements for a current range to be covered. The bar pieces can be embodied as flat bar sections, as Z-shaped angle cleats or as connecting elbows in order to be able to provide a connection between the connecting planes of the bus bars and the connectors of the piece of electric installation equipment by lining up different bar pieces, or by bending or beveling flat bar elements.

SUMMARY OF THE INVENTION

It is one object of this invention to provide a device of the type mentioned above but depending on the size of the current strength to be transmitted, the connecting pieces comprise several identical bar pieces which, for being interlockingly lined up with each other, are securely held in the connecting piece at a preselected distance defined by a thickness of the flat material used.

In accordance with this invention this object is achieved with connecting pieces that are respectively formed by several identical bar elements which are held, vertically with respect to their width, at a distance from each other, which corresponds to a thickness of the flat material. The bar elements are kept apart by means of a packaging holder, which has alternating spacers and holding plates perpendicular with respect to the broad side of the bar elements. The holding plates delimit receivers for the bar elements on both sides of the packaging holders.

It is possible with this embodiment of the device to transmit current of different strengths via the connecting piece, depending on the number of the bar elements used per connecting pieces. Thus the same bar elements can always be used for the current strength areas in the connecting piece where only their number changes. It is possible to directly line up bar elements of the same or different design, which are held at a distance in this way, so that they are interlocked with each other.

An additional fastening of the connecting pieces, for example in a switchgear cabinet, is possible because the packaging holders are fastened on a C-profiled fastening rail with fastening screws passed through bores of the spacers and through the holding plates and with sliding nuts pushed into the C-profiled fastening rail. A spacer of the packaging holder can be pushed into a C-profiled fastening rail or can be inserted in an insertion position and fastened by being rotated, wherein the packaging holders can be fastened by a fastening screw pushed through bores in the spacers and the holding plates so they cannot be displaced in the C-profiled fastening rail. Here, the C-profiled fastening rails can be fastened on the rack of the switchgear cabinet or on mounting rails, which are connected with the rack of the switchgear cabinet. As already mentioned, the bar elements can be laid out in different designs. Thus, flat bar sections, L-shaped angled connecting pieces and Z-shaped angle cleats can be used.

The lining-up of connecting pieces with several bar elements is simplified because the bar elements have fastening bores at least in the end areas.

In connection with the design of the packaging holders, the packaging holders are assembled from individual spacers and individual holding plates. The holding plates can be combined into a one-piece packaging holder.

The packaging holders are designed so that they have a number of holding plates and receptacles for bar elements which corresponds to the number of bar elements in the connecting piece.

In accordance with a further embodiment, the connection of the packaging holders with the C-profiled fastening rail can also be provided so that the bar elements are designed as angle cleats or connecting elbows, and at least one leg is held at the prescribed distance by packaging holders.

BRIEF DESCRIPTION OF THE DRAWINGS

This invention will be explained in greater detail in view of an embodiment represented in the drawing which shows an example of a 3-phase bus bar system with connecting pieces formed by three flat bar elements.

The single drawing FIGURE represents a perspective view of a 3-phase bus bar system, according to one preferred embodiment of this invention.

DESCRIPTION OF PREFERRED EMBODIMENTS

With packaging holders 40, the broad sides of the flat bar sections 10.1, 10.2 and 10.3 of each connecting piece of the three phases PH1, PH2 and PH3 are maintained at a predetermined distance which corresponds to a thickness of the flat material used for the bar sections 10.1, 10.2 and 10.3. Thus the packaging holders 40 with alternating spacers 41 and holding plates 42 on opposite sides form receivers 45 for the flat bar sections 10.1, 10.2 and 10.3. The number of the receivers 45 and the holding plates 42 corresponds to the number of flat bar elements, for example the bar elements in the connecting piece. If the packaging holders 40 can be assembled from the spacers 41 and the holding plates 42, the packaging holders 40 can be easily adapted to the different numbers of bar elements. The packaging holders 40 can also be embodied in one piece with the spacers 41 and the holding plates 42 and can be laid out for a predetermined number of the receivers 45, for example for a connecting element with three bar elements.

The flat bar sections 10.1, 10.2 and 10.3 are inserted with two long sides into a receiver 45 of a packaging holder 40, wherein a sort of pre-fixation in place is achieved by means of a snug fit and/or press fit. With an appropriate greater linear dimension of the rectangular holding plates 42 it is also possible to insert the long sides facing each other of adjoining bar elements of adjoining phases into the receivers 45 of a single packaging holder 40 if the distance of the adjoining phases PH1 and PH2, or PH2 and PH3, as well as the associated connecting pieces, is not too great. With a distance between the phases PH1, PH2 and PH3 in accordance with this embodiment, respectively two packaging holders 40 per connecting piece are useful, wherein the pairs of packaging holders 40 are alternatingly offset from phase to phase in a linear direction of the flat bar sections 10.1, 10.2 and 10.3. Thus the packaging holders 40 are fastened on two parallel oriented C-profiled fastening rails.

If one-piece packaging holders 40 are used, they can be screwed together by means of a fastening screw 43 passed through the spacers 41 and the holding plates 42 with a sliding nut inserted into the C-profiled fastening rail 30.1 or 30.2. Thus the packaging holder 40 can be positioned, fixed against axial displacement, at any arbitrary location in the linear direction of the C-profiled fastening rails 30.1 or 30.2, and the assembled connecting piece can be positioned.

The packaging holder 40 can also be inserted with an insertion piece, formed on the lowermost spacer 41, into the C-profiled fastening rail 30.1 or 30.2 and can be brought into its installed position by rotating, wherein the packaging holder 40 can be fixed in a defined position. The packaging holder 40 thus positioned in the C-profiled fastening rail 30.1 or 30.2 can be additionally set, fixed against axial displacement, by means of a fastening screw 43.

In a switchgear cabinet, the C-profiled fastening rails 30.1 or 30.2 can be connected with the rack or with mounting rails attached to the rack. As shown at the lower end of the flat bar sections 10.1, 10.2 and 10.3 of the assembled connecting piece, connecting legs 21.1, 21.2 and 21.3 of L-shaped connecting elbows 20.1, 20.2 or 20.3, or of Z-shaped angle cleats, can be inserted into the spaces between the flat bar sections, if they are made of the same or similar flat material. By means of fastening bores 12 and 22 it is thus possible to achieve good flat contact between the interlocking connecting pieces. The extended legs of the attached connecting piece can rest directly on each other, or can be kept at a defined distance by means of package holders 40. The upper end of the connecting piece put together from flat bar sections 10.1, 10.2 and 10.3 also offers equal connecting possibilities for further identical or different connecting pieces assembled from identical or different bar elements. The associated packaging holder 40 can be fastened on the C-profiled fastening rails 30.1 or 30.2, which need not necessarily be fastened in the switchgear cabinet, but are merely used as supports for the packaging holders 40.

What is claimed is:

1. In a device for connecting bus bars of a bus bar system with connectors of a piece of electric installation equipment using connecting pieces which are at least one of cut, angled and bent from a flat material, the improvement comprising:

the connecting pieces formed by a plurality of bar elements (10.1, 10.2, 10.3) each having a rectangular cross section, the bar elements (10.1, 10.2, 10.3) held vertically with respect to a width of the bar elements (10.1, 10.2, 10.3), the bar elements (10.1, 10.2, 10.3) held at a distance from each other, the distance corresponding to a thickness of the flat material, a rail (30.1, 30.2) extending in a longitudinal direction.

the bar elements (10.1, 10.2, 10.3) maintained apart by a packaging holder (40) having a spacer (41) attached to the rail (30.1, 30.2) and a plurality of holding plates (42) spaced and aligned in a direction perpendicular with respect to a broad side of each of the bar elements (10.1, 10.2, 10.3), and the spaced holding plates (42) forming a plurality of receivers (45) on opposite sides of the packaging holder (40) for accommodating the bar elements (10.1, 10.2, 10.3).

2. In the device in accordance with claim 1, wherein the rail (30.1, 30.2) is a C-profiled fastening rail (30.1, 30.2) with fastening screws (43) that pass through a first bore (44) of the spacer (41) and through second bores of the holding plates (42) and with sliding nuts pushed into the C-profiled fastening rail (30.1, 30.2).

3. In the device in accordance with claim 1, wherein one of the spacers (41) is one of pushed into a C-profiled fastening rail (30.1, 30.2) and inserted in an insertion position and rotatably fastened, wherein the packaging holder (40) is fastened with a fastening screw (43) that passes through a first bore (44) in the spacer (41) and through second bores of the holding plates (42) to prevent displacement in the C-profiled fastening rail (30.1, 30.2).

4. In the device in accordance with claim 1, wherein the bar elements (10.1, 10.2, 10.3) are designed as flat bar sections.

5. In the device in accordance with claim 1, wherein the bar elements are connected to L-shaped elbows.

6. In the device in accordance with claim 5, wherein the bar elements (10.1, 10.2, 10.3 and 20.1, 20.2, 20.3) have fastening bores (12, 22) at least in one end area.

7. In the device in accordance with claim 6, wherein the packaging holder (40) is assembled from an individual said spacer (41) and individual said holding plates (42).

8. In the device in accordance with claim 6, wherein the spacer (41) and the holding plates (42) are combined into one piece.

9. In the device in accordance with claim 8, wherein the packaging holder (40) has a first number of the holding plates (42) forming the receivers (45) for the bar elements (10.1, 10.2, 10.3 or 20.1, 20.2, 20.3) which corresponds to a second number of the bar elements in the connecting piece.

10. In the device in accordance with claim 9, wherein with the bar elements designed as connecting elbows, at least one leg is held at a prescribed distance by the packaging holder (40).

11. In the device in accordance with claim 8, wherein the spacer (41) of the packaging holder (40) is one of pushed into a C-profiled fastening rail (30.1, 30.2) and inserted in an insertion position and rotatably fastened, wherein the packaging holder (40) is fastened with a fastening screw (43) that passes through a first bore (44) in the spacer (41) and through second bores of the holding plates (42) to prevent displacement in the C-profiled fastening rail (30.1, 30.2).

12. In the device in accordance with claim 1, wherein the bar elements (10.1, 10.2, 10.3 and 20.1, 20.2, 20.3) have fastening bores (12, 22) at least in one end area.

13. In the device in accordance with claim 1, wherein the packaging holder (40) is assembled from an individual said spacer (41) and individual said holding plates (42).

14. In the device in accordance with claim 1, wherein the spacer (41) and the holding plates (42) are combined into one piece.

15. In the device in accordance with claim 1, wherein the packaging holder (40) has a first number of the holding plates (42) forming the receivers (45) for the bar elements (10.1, 10.2, 10.3 or 20.1, 20.2, 20.3) which corresponds to a second number of the bar elements in the connecting piece.

16. In the device in accordance with claim 1, wherein with the bar elements designed as connecting elbows, at least one leg is held at a prescribed distance by the packaging holder (40).

* * * * *